No. 729,949. PATENTED JUNE 2, 1903.
F. H. LINDNER.
MECHANICAL MOVEMENT.
APPLICATION FILED APR. 19, 1902.
NO MODEL. 7 SHEETS—SHEET 1.

WITNESSES: INVENTOR
F. H. Lindner
BY
ATTORNEYS

No. 729,949. PATENTED JUNE 2, 1903.
F. H. LINDNER.
MECHANICAL MOVEMENT.
APPLICATION FILED APR. 19, 1902.
NO MODEL. 7 SHEETS—SHEET 2.

WITNESSES:
J. A. Kehlenbeck
John Lotka

INVENTOR
Frank H. Lindner
BY Briesen & Knauth
ATTORNEYS

No. 729,949. PATENTED JUNE 2, 1903.
F. H. LINDNER.
MECHANICAL MOVEMENT.
APPLICATION FILED APR. 19, 1902.
NO MODEL. 7 SHEETS—SHEET 6.

WITNESSES:
John Lotka
John A. Kehlenbeck

INVENTOR
Frank H. Lindner
by Briesen & Knauth
ATTORNEYS.

No. 729,949. Patented June 2, 1903.

UNITED STATES PATENT OFFICE.

FRANK H. LINDNER, OF BAYONNE, NEW JERSEY.

MECHANICAL MOVEMENT.

SPECIFICATION forming part of Letters Patent No. 729,949, dated June 2, 1903.

Application filed April 19, 1902. Serial No. 103,776. (No model.)

*To all whom it may concern:*

Be it known that I, FRANK H. LINDNER, a citizen of the United States, and a resident of Bayonne, county of Hudson, State of New Jersey, have invented certain new and useful Improvements in Mechanical Movements, of which the following is a specification.

My invention relates to mechanical movements, the object of which is to produce a movement with varying speed. Such movements are applicable in many machines, as instances of which I would refer particularly to the class of machines in which the raw material and half-finished articles are successively carried from one section or organism of the machine to another, with a dwell or stop at each organism for the purpose of subjecting the material to a series of successive operations. Another instance of a case in which a movement of variable speed is useful and desirable is found in printing-presses having a reciprocating bed.

The invention of course is applicable to any machine or organism in which a movement of the indicated character may be useful.

My invention has for its object to provide a comparatively simple and positively-operating mechanism for producing a movement with varying speed, and particularly a movement which for a certain period has a constant speed preceded by a period of increasing speed and followed by a period of gradually-decreasing speed.

Another object of my invention is to so construct the mechanism as to be able to considerably vary the ratio of speed increase or decrease and so as to be even able to produce a temporary stoppage of the movement.

Other features of my invention reside in constructive features by which loose movement or backlash is prevented or minimized and a smooth steady transition is obtained from and to the period during which the speed is uniform.

To illustrate my invention, I have shown several forms of it in the accompanying drawings, without, however, wishing to be understood as limiting myself to these particular constructions.

In the drawings, Fig. 13$^a$ is an end view of this form of construction with the mechanism for driving it. Fig. 16$^a$ is a plan of this form of my invention.

Figures 1, 3:
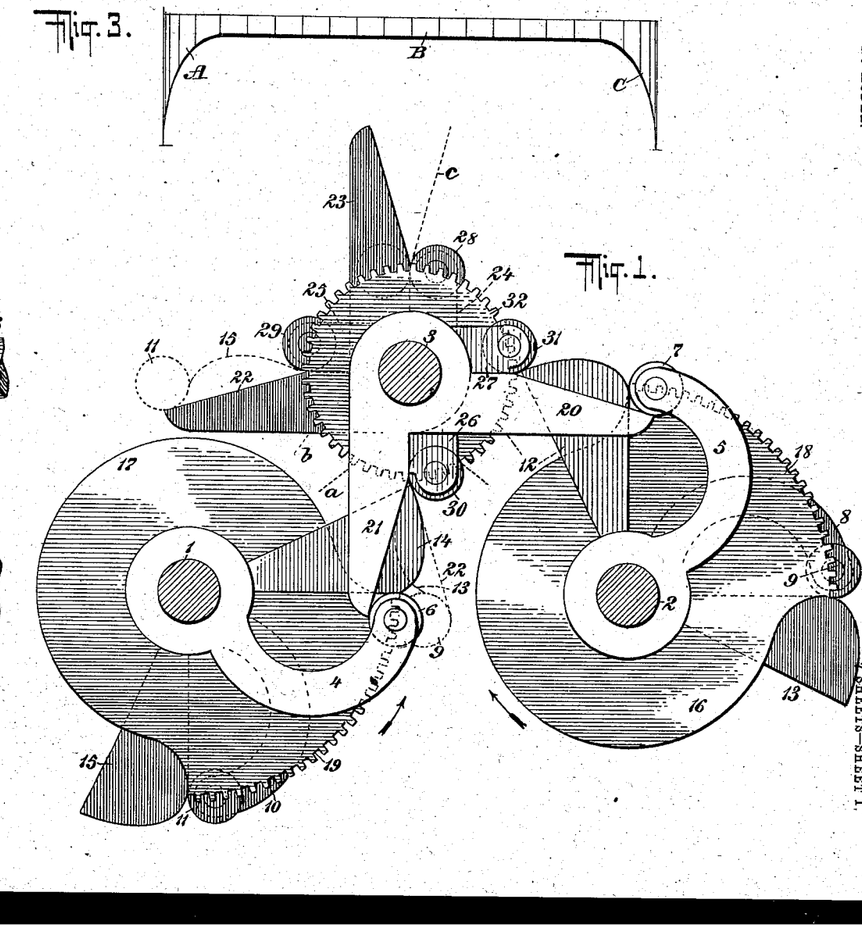
Figure 1 is a face view of one form of my movement with the shafts in section.
Fig. 3 is a diagram of the movement.
Figure 2:
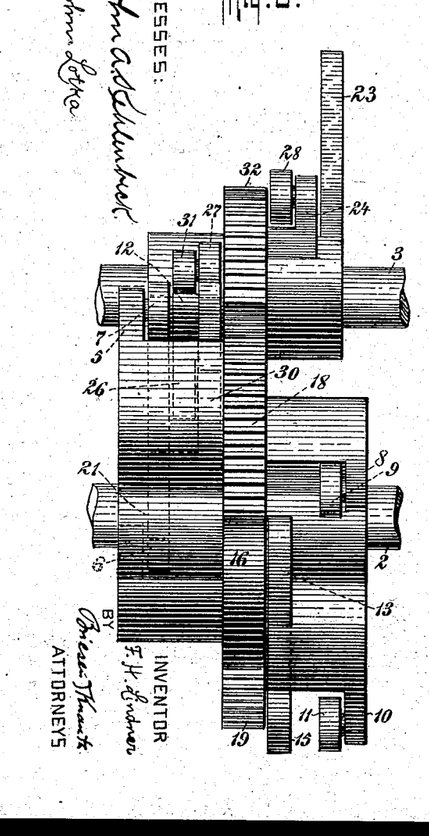
Fig. 2 is an end view thereof.
Figure 4:
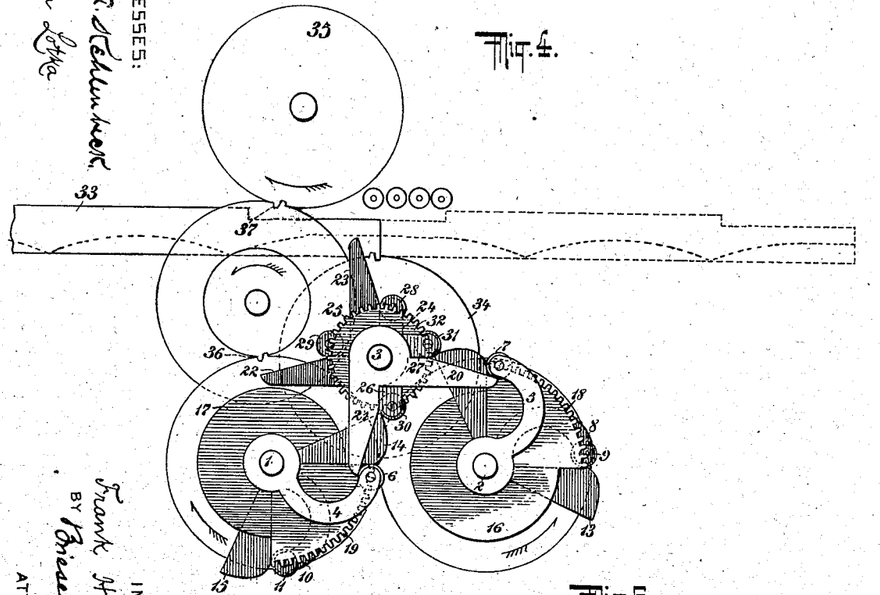
Fig. 4 shows the same movement applied to a printing-press.

As illustrated in Fig. 1, I employ three parallel shafts 1, 2, and 3, which when seen in end view are arranged at the apexes of a right-angle isosceles triangle. Two of these shafts, 1 and 2, are arranged to rotate in opposite directions, and any suitable mechanism is employed for accomplishing this result. For instance, one of the shafts will be driven by a belt, and the two shafts may be connected directly by gearing, as indicated in Fig. 4. These shafts 1 and 2 are supposed to rotate at a uniform rate of speed, although it will of course be understood that variations from a uniform rate of speed will not materially affect the utility of my invention. The third shaft, 3, is the one which is given a rotation with varying speed—that is, the speed is first slow, then increases gradually to a certain rate, remains constant for a definite period, and then again decreases gradually. In the particular form illustrated the motion of the shaft 3 is an oscillating motion—that is, the shaft turns first in one direction and then in the other. The extent of the shaft's movement is about three-quarters of a revolution. A similar driving mechanism is secured to each of the shafts 1 and 2; but corresponding parts on the shafts are differently located, so that their positions in relation to their respective shafts will always differ by about ninety degrees. Thus each shaft carries rigidly an arm 4 and 5, respectively, with a roller 6 or 7 respectively journaled at the end. In a different plane to these two arms and rollers are located arms 8 and 10, with rollers 9 and 11, there being also a difference in position of about ninety degrees between the rollers 6 and 11 and the rollers 7 and 9. Adjacent to each of the rollers is also rigidly secured a cam, the four cams being numbered 12, 13, 14, and 15, respectively, and it will be understood that each cam on one shaft is in the same plane with a cam on the other shaft, but in a different plane from the other cam on the same shaft. Between the roller-carrying arms and the cams is located a plate or hub 16 and 17, respectively provided with a toothed segment 18 and 19, respectively, the ends of each segment coinciding practically, or rather registering, with the common tangential plane of the adjacent cam and roller, as clearly shown in Fig. 1.

On the shaft 3 are rigidly secured four arms 20, 21, 22, and 23, respectively, each of which has an inclined or cam surface adapted to be engaged by one of the rollers 6, 7, 9, or 11, respectively. Two of these arms, 20 and 21, are therefore in a plane different from that of the other arms, 22 23. In a plane corresponding with that of the cams 12 and 14 are arranged two rollers 30 and 31, carried by brackets 26 and 27. In the plane of the cams 13 and 15 are arranged rollers 28 29, carried by brackets 24 25, respectively. In the central plane, which is located between those of the cams and coincides with the plane of the segments 18 19, is located a gear-wheel 32. The inclined face of each of the cams 20 21 22 23 is so arranged as to lead directly to the inner end of one of the teeth of the gear-wheel 32.

The operation is as follows: Assuming the parts to be in the position shown in Fig. 1, with the shafts 1 and 2 rotating in the directions indicated by arrows, it will be seen that the only driving engagement is between the roller 6 and the arm 21. This will rotate the shaft 3 clockwise with a speed which increases gradually, because the roller 6 comes progressively nearer the shaft 3. When the forward tooth of the toothed sector 19 comes into the position indicated by the dotted line $a$, it will enter the space between two teeth of the gear-wheel 32 and the point of contact of roller 6 with arm 21 will be at a distance from the center slightly greater than the outer radius of the wheel 32. At the line indicated at $b$ the teeth of the sector 19 and of the gear-wheel 32 will again come out of engagement. Of course as long as the segment 19 and the gear-wheel 32 are in mesh the shaft 3 will rotate at a uniform rate of speed if the rotation of the shaft 1 is uniform. By the time the last tooth of the sector 19 is about to leave the gear-wheel 32 at line $b$ the roller 28 comes into engagement with the inclined surface of the cam 15, and immediately after the wheel 32 has come out of engagement with the sector 19 the roller 28 travels on the inclined surface of the cam 15, and thus a slow-down movement with a gradual decrease of speed is obtained. In the diagram Fig. 3, A indicates the starting or initial movement with increasing speed, B the movement of constant speed, and C the end movement with a gradual decrease of speed. The spaces between the vertical lines indicate equal intervals of time. While the shaft 1 is thus the driving-shaft the shaft 2 and the parts connected therewith perform no driving function. When, however, the driving action of shaft 1 has ceased, the shaft 2 will have turned far enough to bring the roller 9 into operative engagement with the arm 22, which will then be in its lowermost position, as indicated in dotted lines adjacent to the representation of the roller 6. The roller 9 will then travel along the inclined face of the arm 22, thus turning the shaft 3 with an increasing speed in a direction opposite to that of its first rotation. Then the toothed sector 18 will engage the gear-wheel 32 and turn the shaft 3 at a uniform rate of speed for a certain period, and finally the roller 31 will engage the cam 12 and produce a slow downward movement of the same character as that obtained by the engagement of the roller 28 with the cam 15.

The cams 13 and 14 operate, in conjunction with the rollers 29 and 30, to prevent backlash. Thus in the position illustrated by Fig. 1 the roller 30 engages the cam 14 and prevents the shaft 3 from rotating faster than it is driven by the roller 6. The cam 12 is just about to leave the roller 31, and inasmuch as the angular speed of the cam is much greater than that of the roller at this moment no binding action will take place. If the shafts 1 and 2 rotate in opposite direction to that indicated by arrows, they will act in a different way—that is, the rollers 7 and 11 will produce the starting movement with increasing speed and the cams 13 and 14 will produce the slow-down at the end of the movement, and in this case the cams 12 and 15 will operate, in conjunction with the rollers 28 and 31, to prevent backlash.

If, as in many cases will be sufficient, it is not desired to have the shafts 1 and 2 made reversible, the apparatus will be fully operative if the arms 5 10, rollers 7 11, cams 13 14, arms 20 23, and rollers 29 30 are omitted. The shafts 1 and 2 will then have to rotate in the direction indicated by arrows and will not be able to operate the mechanism if rotated in the opposite direction. It will be observed, however, that in this case there will be nothing to hold the shaft 3 from turning faster than it is driven. This, for instance, might happen if the mechanism connected with the shaft is rather heavy, so as to gather a considerable momentum during the time the shaft 3 is driven by the engagement of the toothed gears, which momentum might cause the shaft to run ahead during what should be a slow-down movement. In all cases where this possibility is to be avoided the duplicate arrangement shown will be provided where in each case there is at the same time an engagement of a driving element with a suitable element on the driven member and also an engagement of a retaining element with a suitable portion of the driven member. Incidentally the construction is such that those members which are retaining members when the shafts 1 and 2 rotate in one direction become driving members or elements when said shafts rotate in the opposite direction, and vice versa.

In Fig. 4 I have shown my improved movement applied to a printing-press. 33 is the reciprocating bed, driven by a wheel 34 on the shaft 3, and 35 is the impression-cylinder, driven, for instance, from the shaft 1 by means of gearing 36 37.

Figure 6:
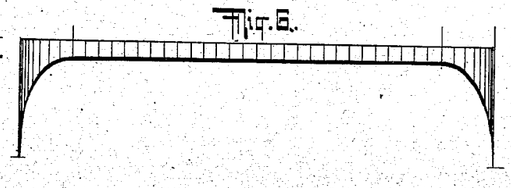
Fig. 6 is a diagram of the movement.

The diagram Fig. 6 is substantially the same as Fig. 3.

Figures 5, 8:
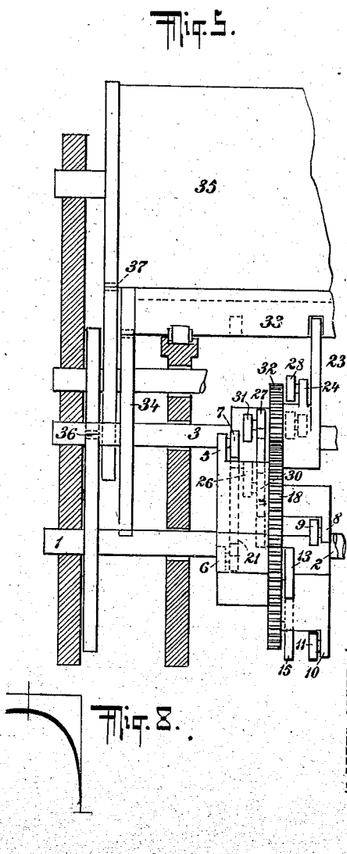
Fig. 5 is a partial cross-section of such a press.
Figs. 7 and 8 show how the initial and final movements may be modified.
Figure 7:
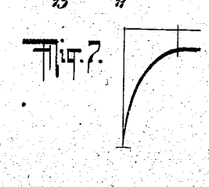

Figs. 7 and 8 show modifications of the speed-up and slow-down movements, it being understood that by giving the active surfaces of the arms 20 21 22 23 various outlines I am enabled to obtain results of different character—that is, the speed may be made to increase very slowly at first and more rapidly afterward, or the arms may be so formed that when they are first engaged by the corresponding rollers the shaft 3 will remain stationary for a moment, so as to facilitate the disengagement of the cams from the corresponding rollers on the shaft 3.

Figures 16, 17:
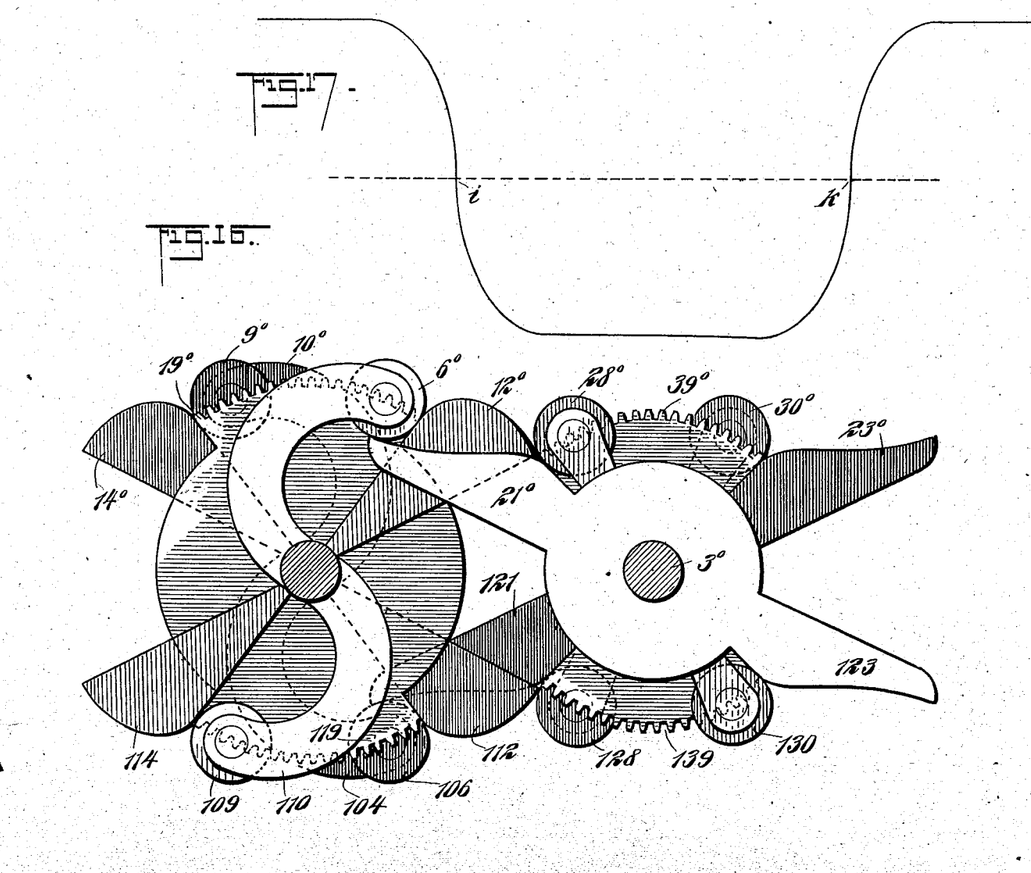
Fig. 16 is a front view of still another form of my invention.
Fig. 17 is a diagram of the movement obtained thereby.

In the construction illustrated by Figs. 1 and 4 the faces of the arms 20 21 22 23, which are engaged by the driving-rollers 6 7 9 11, are substantially straight. This, however, is not an essential feature of my invention, and it will be understood that the operating-faces of these engaging arms or elements may be made curved and that according to their shape the ratio of speed increase may be considerably varied. For instance, if the ends of these arms are so curved that they will be substantially concentric to the path of the rollers I may secure a very easy starting movement, inasmuch as the driven member constituted by the shaft 3 and the parts thereon will be practically at a standstill when the driving-roller first engages one of said arms at its outer end. Arms of substantially this shape are shown, for instance, in Fig. 16.

Fig. 6 illustrates a movement substantially the same as that in Fig. 3, while Figs. 7 and 8 illustrate modifications of the end movements, the movement in Fig. 7 being quicker in its changes than the one in Fig. 8.

Figure 9:
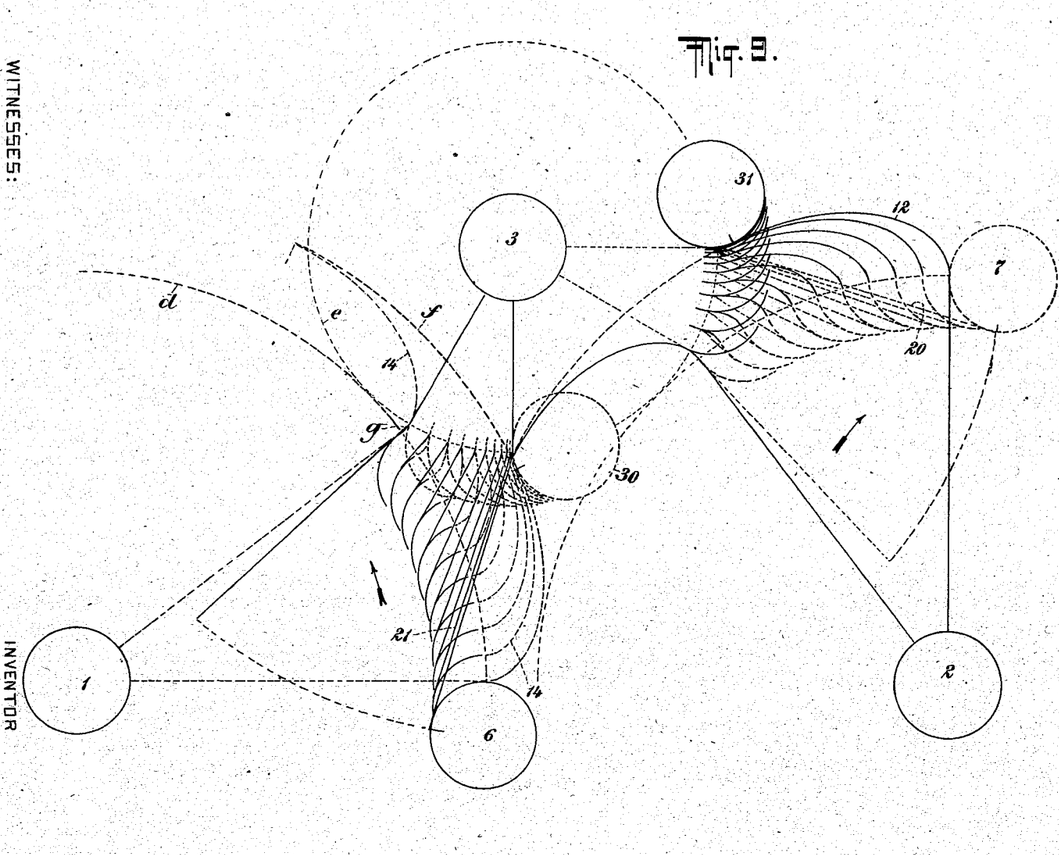
Fig. 9 is a diagram of the entire movement.

In Fig. 9 I have illustrated diagrammatically the movements of the parts during the speed-up and slow-down movement in each direction. On the circular line $d$, which indicates the path of the roller 6 around the shaft 1, I have indicated points at even distances, thus indicating equal intervals of time, and at each of these points I have shown in full lines the corresponding position of a portion of the roller 6 and in dotted lines the corresponding position of the cam 14. On the circle $e$, which indicates the pitch-line of the gear-wheel 32, I have indicated the corresponding positions of the roller 30, which is in engagement with said cam 14, and, further, in solid lines I have indicated various successive positions of the arm 21, which is engaged by the roller 6. The toothed line $f$ indicates the path of the extreme outer end of the cam 14. It will be seen that while the speed of the shaft 1 is uniform that of the shaft 3 increases gradually up to the point $g$, which corresponds to the one indicated by the line $a$ in Fig. 1. At the right-hand portion of Fig. 9 the positions of the cam 12, rollers 7 31, and arm 20 are illustrated in a corresponding manner, the cam 12 being represented as driving the roller 31, while the arm 20 coöperates with the roller 7 to hold the driven member against movement independent of that imparted to it by the cam 12. These views when read for a direction of rotation opposite to that indicated by the arrows show at the left the driven member actuated by the engagement of the cam 14 with the roller 30 and held back by the engagement of the roller 6 with the arm 21, and at the right, with the rotation in the other direction, we find illustrated the driving action of the roller 7 on arm 20 and the holdback action of the cam 12 in connection with the roller 31.

Figures 10, 12:
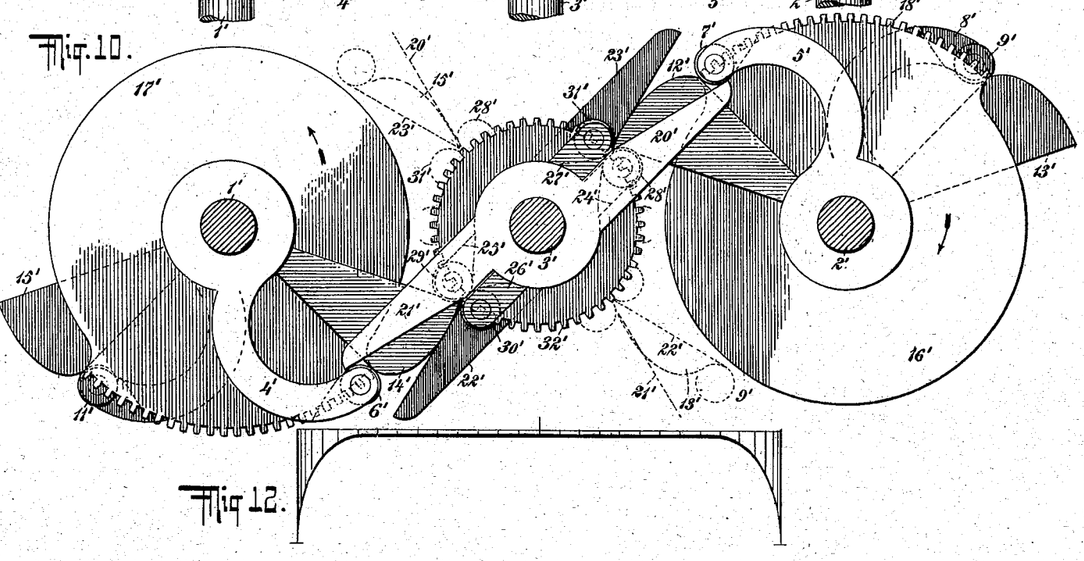
Fig. 10 is a front view of another form of my invention.
Fig. 12 is a diagram of the corresponding movement.
Figure 11:
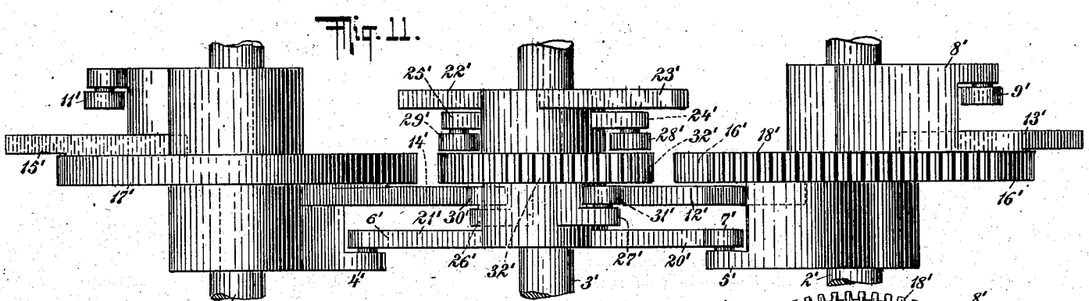
Fig. 11 is a plan view thereof.

In Figs. 10 and 11 the shafts 1', 2', and 3' are arranged in the same plane. The parts connected with the driving-shafts 1' 2' are practically the same as in Fig. 1 and are indicated by corresponding reference-numerals. The four arms 20' 21' 22' 23' on the driven shaft 3' instead of being arranged about at right angles to each other are disposed diametrically opposite to each other, and the rollers 28', 29', 30', and 31' are similarly arranged. In other respects the construction and operation are the same as hereinbefore described, as illustrated by the diagram Fig. 12.

I have referred to the shafts 1' and 2' as carrying rigidly all the parts mounted thereon; but it will of course be understood that these parts may be mounted loosely, the shaft then constituting an axle.

Figures 13, 14, 15:
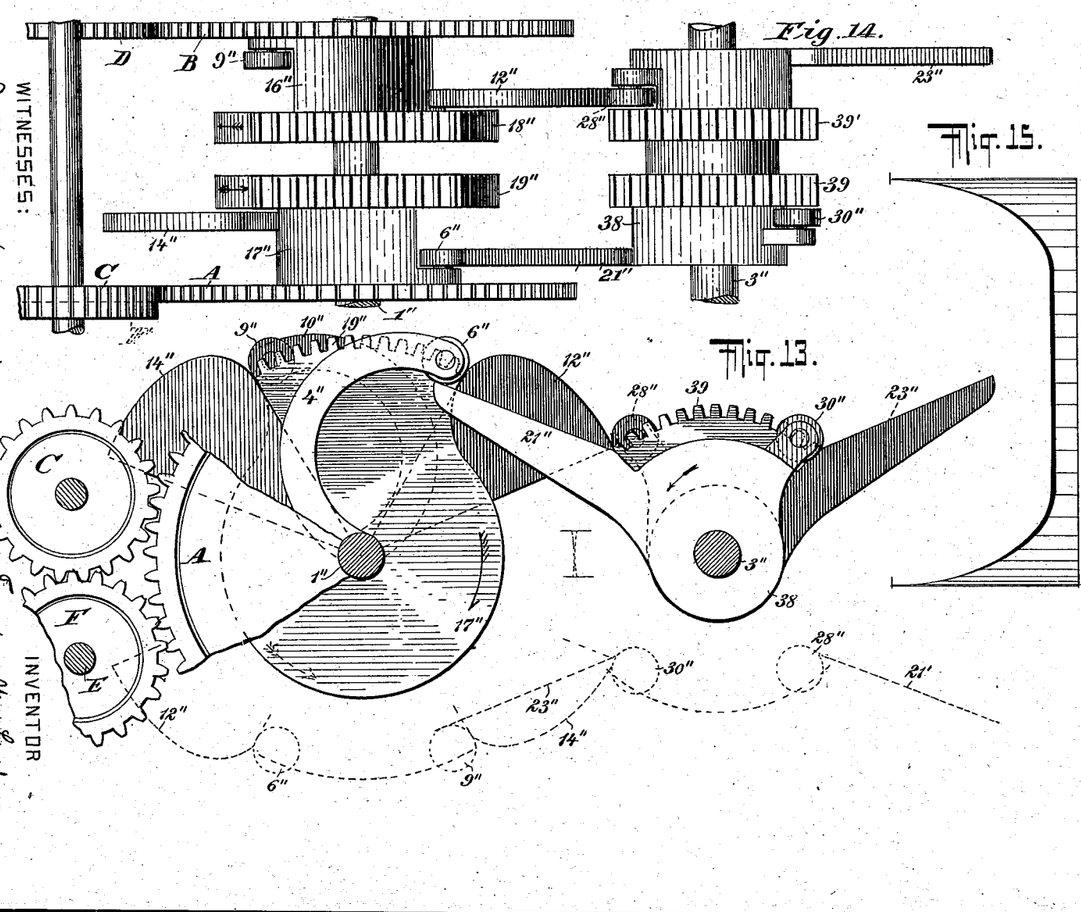
Fig. 13 is an elevation of a third form of my invention.
Fig. 14 is a plan view thereof.
Fig. 15 is a diagram of the corresponding movement.
Figure 13A:
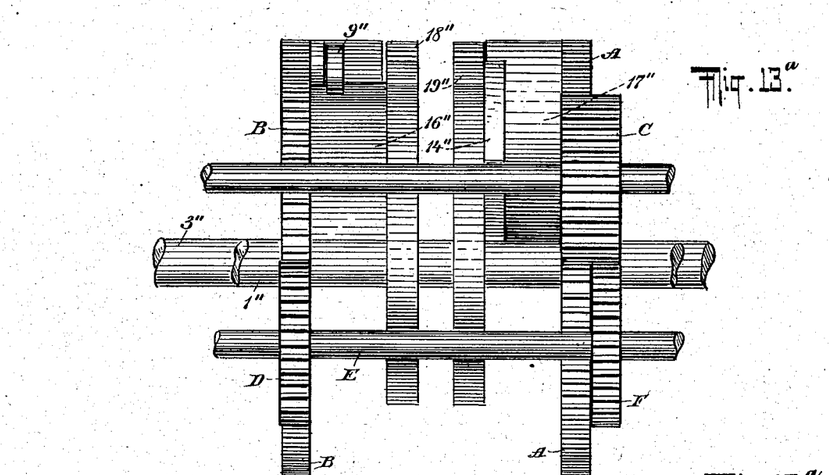
Figure 15A:
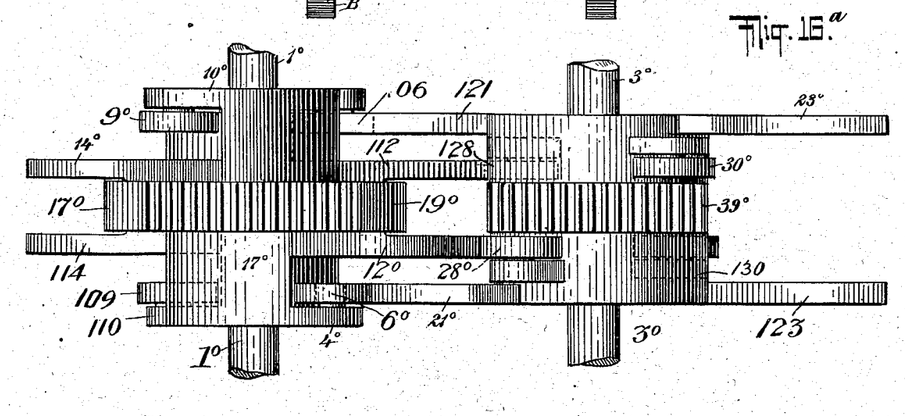

In Figs. 13 and 14 I have illustrated a construction in which both driving devices are mounted on the same shaft. This may be done either by mounting both driving devices loosely on the shaft, which latter forms an axle, or by mounting one of them loosely while the other is rigidly upon the shaft. 1'' is the shaft or axle, for instance, rigid with the body 16'' of one of the driving devices. The body 17'' of the other driving device would then be mounted loosely on the shaft. It will be understood that the two bodies 16'' and 17'', together with the parts they carry, are rotated in opposite directions at the same rate of speed by any well-known or approved mechanism—as, for instance, by gear-wheels A B, each rigidly secured to one of said bodies, one of said wheels engaging an intermediate pinion C, while the other meshes with a pinion D upon a drive-shaft E, which also carries a gear-wheel F in mesh with the intermediate gear C. 4″ is the arm carrying the driving-roller 6″, which in the position shown is in driving engagement with the arm 21″ on the body 38 of the driven device, which may be rigid with the shaft 3″. 19″ is the toothed segment on the plate 17″, which toothed segment is adapted to engage the toothed sector 39 after the roller 6″ has traveled to the inner end of the arm 31″. 14″ is a cam adapted to engage the roller 30″ at about the moment the toothed portions 19″ and 39 come out of engagement. The other driving device has a toothed segment 18″, adapted to engage a corresponding toothed sector 39′ on the body 38, a roller 9″, adapted for driving engagement with an arm 23″ on the body 38, and a cam 12″, arranged to engage a roller 28″ on the body 38. As shown by diagram Fig. 15, the shaft 3″ is first given a movement with increasing speed as long as the roller 6″ travels on the arm 21″, the engagement of the cam 12″ and roller 28″ preventing backlash during this period. Then follows a period of uniform rotation during the engagement of the toothed portions 19″ and 39, and then follows a slow-down movement during the engagement of the roller 9″ with the arm 23″. At the end of this slow-down movement the parts will reach the lower position. (Illustrated by dotted lines in Fig. 13.) The roller 9″ will then begin to drive in the opposite direction by engaging the arm 23″, and at the same time the cam 14″ and the roller 30″ will engage each other to hold the parts steady. As the roller 9″ travels inward on the arm 23″ the speed of the driven shaft 3″ will increase until the gear 18″ meshes with the gear 39′, causing the shaft 3″ to rotate at a uniform speed during a certain period, after which the cam 12″ will engage the roller 28″ and effect the slow-down movement, while the parts are held steady by the engagement of the arm 21″ with the roller 6″. Thus the parts again reach the position shown in full lines in Fig. 13.

As far as above described my movement is applied to the production of an oscillating movement—that is, the driven shaft or driven member is first moved in one direction and then in the opposite direction. My invention, however, is not limited to this specific case, but is applicable as well to a movement continually in the same direction, but varying in its ratio of speed. Such a movement I have illustrated in Fig. 16, where the driven shaft 3° turns constantly in the direction indicated by the arrow. By this I do not mean that the shaft is necessarily in motion at all times, as it may very well stop at certain periods, or even move slightly backward at such periods; but what I mean is simply that the main movement of the shaft is always in the same direction and that there is no periodical reversal, as in the examples described before. In this construction I have shown a double driving device similar in some respects to that in Fig. 13. In fact, the driving device is practically a duplication of that shown in Fig. 13. The cams 12° and 14°, arms 4° and 10°, and rollers 6° and 9°, together with the gear 19°, are practically the same as those at the upper half of Fig. 13. The lower half contains the same parts symmetrically disposed—viz., cams 112 and 114, rollers 106 and 109, and arms 104 and 110, and a gear 119. All these parts, as well as the body 17°, rotate together with the shaft 1° or upon the same. The roller 6° is in contact with the engaging element or arm 21°, and at the same time the cam 12° forms a holdback in connection with the roller 28°. After the speed-up movement, which brings the roller 6° to the inner end of the arm 21°, the gear 19° engages the toothed sector 39°. At the end of the uniform movement the cam 14° engages the roller 30° to produce the slow-down movement. The form of the arms 21°, 23°, 121, and 123 is such as to produce practically a standstill of the driven member at the beginning of the speed-up movement and at the end of the slow-down movement, as indicated by $i$ $k$ in the diagram Fig. 17. When the cam 14° has ceased to drive the roller 30°, the roller 109 comes into driving engagement with the arm 123, and thus the movement is continued in the same manner as before described, since at the beginning of this second period the roller 109 and the arm 123 are in exactly the same position as that represented for the roller 6° and the arm 21°. With the driving-shaft 1° rotating in the direction indicated the rollers 9°, 28°, 130, and 106, the arms 23° and 121, and the cams 12° and 114 act as holdback elements only. The shaft 3° will thus be driven in a contra-clockwise direction with a speed varying in the manner above described. If it is desired to rotate the shaft 3° clockwise, the shaft 1° is reversed, and then those elements which have been just referred to as "holdback" or "retaining" elements become driving elements, while those which previously were driving elements become retaining elements. It will of course be understood that in Fig. 16 all the parts mounted on the shaft rotate together in the same direction and not in opposite directions, as in Figs. 13 and 14. I desire it to be understood that the arrangement of the parts in a certain succession of planes may be varied without departing from my invention. All that is necessary is of course that the parts which are intended to coöperate should move in the same plane, so that they will come together at the proper times; otherwise, however, it is immaterial whether the toothed gearing be given a central position, as has been illustrated, or whether it be located at the end.

It will further be understood that the particular mechanism for producing the speed-up and slow-down movement before and after the meshing of the toothed gears may be considerably altered without sacrificing the advantages of my invention.

What I claim as new, and desire to secure by Letters Patent, is—

1. In a mechanical movement, the combination with driven instrumentalities mounted to move in unison in the same relative position to each other, said instrumentalities comprising a toothed gear, an engaging element extending beyond said gear, and a roller forming another engaging element and located at a different point of the gear, of driving instrumentalities mounted to move in unison with each other in the same position relatively to each other, said driving instrumentalities comprising a gear adapted to engage the driven gear, a roller arranged to engage the said outwardly-extending engaging element, and a cam arranged to engage the driven roller.

2. In a mechanical movement, the combination with driven instrumentalities comprising a toothed gear, an outwardly-extending engaging element adjacent to one point of said gear, a roller adjacent to said point on the gear, and another roller adjacent to a different point on the gear, of driving instrumentalities comprising a toothed gear adapted to mesh at intervals with the driven gear, a roller arranged for driving contact with the outwardly-extending engaging element, a driving-cam arranged for engagement with that driven roller which is distant from said engaging element, and a holdback-cam arranged to engage the other driven roller at the time the engaging element is in driving engagement with the driving-roller.

3. In a mechanical movement, the combination with driven instrumentalities held to move in unison, comprising a driven gear, a set of engaging elements located at different points of said gear, and another set of engaging members located in proximity to said engaging elements, of driving instrumentalities comprising a gear adapted to mesh with said driven gear, two driving elements located at the ends of the driving-gear and adapted for contact with the said first set of engaging elements, and cams located adjacent to the ends of the driving-gear and arranged to engage the second set of engaging members.

4. In a mechanical movement, the combination of a set of driven instrumentalities comprising a toothed gear, and engaging elements adjacent to different points of said gear, with two sets of driving instrumentalities, each comprising a toothed gear, the two driving-gears being arranged to mesh at intervals and at different times with the driven gear, and driving elements located adjacent to those points at which the driving-gears come into or out of mesh with the driven gear, said driving elements being adapted to coöperate with the said engaging devices to give the set of driven instrumentalities an increasing speed up to the time the gears mesh with each other, and a decreasing speed after the gears have come out of mesh.

5. In a mechanical movement, the combination of two sets of driving instrumentalities and one set of driven instrumentalities, all of these sets comprising toothed gears, those of the driving sets being arranged to come into mesh with the driven set alternately, each driving set comprising additional driving elements arranged adjacent to those points at which the respective driving-gear comes into and out of mesh with the driven set, and the driven set comprising engaging devices arranged to coöperate with said additional driving elements.

6. In a mechanical movement, a set of driven instrumentalities, and a plurality of sets of driving instrumentalities, each set having its elements connected to move in unison in the same relative position to each other, and all sets comprising toothed gears, the driving-gears being arranged to mesh with the driven set at intervals and at different times, each driving set comprising additional driving elements arranged adjacent to those points at which the driving action of the respective gears begins and ends, and the driven set comprising engaging elements adapted for contact with said additional driving elements.

7. In a mechanical movement, the combination of two sets of driving instrumentalities arranged to rotate in opposite directions, and each comprising a driving-gear, with a set of driven instrumentalities with which the said gears are adapted to mesh alternately so as to drive it in opposite directions, each of the said driving sets comprising additional driving elements located adjacent to those points at which the corresponding driving-gear comes into and out of mesh with the driven set, and the said driven set comprising engaging elements arranged to coöperate with the said additional driving elements.

8. In a mechanical movement, the combination of a driving-gear and a driven gear adapted to mesh at intervals, with an engaging element mounted to turn with the driven gear and located adjacent to one of the limits of the meshing of said gears, a driving element mounted to turn with the driving-gear and arranged to coöperate with said engaging element at a time when the gears are out of mesh, a retaining element mounted to turn with the driving-gear, and another retaining element mounted to turn with the driven gear and arranged to coöperate with the first-named retaining element, said retaining elements being arranged in a plane of rotation different from that in which the said driving element and engaging element move.

In testimony whereof I have signed my name to this specification in the presence of two subscribing witnesses.

FRANK H. LINDNER.

Witnesses:
JOHN LOTKA,
OTTO V. SCHRENK.